United States Patent [19]
Takai et al.

[11] Patent Number: 5,873,383
[45] Date of Patent: Feb. 23, 1999

[54] GENERAL SERVICE WATER STORING EQUIPMENT

[75] Inventors: Seiichiro Takai; Mitsuhiko Tsuchiya, both of Tokyo, Japan

[73] Assignees: Totetu Mfg. Co., Ltd.; Sanyokogyo Co., Ltd., both of Tokyo, Japan

[21] Appl. No.: 843,792

[22] Filed: Apr. 21, 1997

Related U.S. Application Data

[63] Continuation of Ser. No. 367,299, Jan. 4, 1995, abandoned.

[30] Foreign Application Priority Data

May 21, 1993 [JP] Japan .................................. 5-118883

[51] Int. Cl.$^6$ .................................................. E04D 13/00
[52] U.S. Cl. .......................... 137/357; 137/256; 137/259; 137/571
[58] Field of Search .................................... 137/357, 255, 137/256, 259, 571

[56] References Cited

U.S. PATENT DOCUMENTS

| 2,508,170 | 5/1950 | Kaufmann | 137/571 |
| 5,234,286 | 8/1993 | Wagner | 137/357 |

FOREIGN PATENT DOCUMENTS

| 6874 | 7/1902 | United Kingdom | 137/357 |
| 1329141 | 9/1973 | United Kingdom | 137/571 |
| 1459203 | 12/1976 | United Kingdom | 137/571 |

*Primary Examiner*—A. Michael Chambers
*Attorney, Agent, or Firm*—McAulay Nissen Goldberg Kiel & Hand, LLP

[57] ABSTRACT

Three storage vessels 11–13 are stacked at positioned lower than a rainwater gutter 14. The rainwater gutter and the first storage vessel 11 are connected by a first supply passage 21, the second supply passage 22 connected to a lower face of the first storage vessel at one end thereof is provided with a supply valve 33 at the other end thereof. The third supply passage 23 provided with a nonreturn valve 43 is connected passage 23 provided with a nonreturn valve 43 is connected with a lower face of second and third storage vessels 12, 13 at one end thereof, and connected to a second supply passage at the other end thereof respectively. When the rainwaters stored in the first and second storage vessels go up in the water level up to over a predetermined water level, an overflow passage 41 leads the rainwater exceeding over the predetermined water level to the second and third storage vessels respectively. The rainwater is collected in the storage vessels in order from the first storage vessel, and the rainwater is supplied to the destination of supply from the first storage vessel.

The general service water storing equipment can be installed in a relatively narrow space, and can increase and decrease the water storage capacity relatively easily by increasing and decreasing the number of the storage vessels, and further can supply the stored rainwater to the required place as the general service water without a pump by utilizing the potential energy of the rainwater of the storage vessel.

3 Claims, 11 Drawing Sheets

GENERAL SERVICE WATER STORING EQUIPMENT

This is a continuation of application Ser. No. 08/367,299, filed Jan. 4, 1995 now abandoned.

TECHNICAL FIELD

This invention relates to an equipment for storing a rainwater dropping on a roof of a house or a housetop and a used water of a bathtub, more precisely relates to a general service water storing equipment utilizing a stored water as a general service water such as a sprinkle water over a garden, a washing water for a car, a flushing water for a toilet and the like.

BACKGROUND ART

Up to now, in order to utilize effectively a rainwater, there is started to be conducted a method of storing the rainwater in a ground storage vessel disposed on a ground or an underground storage vessel embedded under the ground, and supplying this stored rainwater to a required place as a general service water by means of a pump.

On the other hand, in order to utilize effectively the used water of the bathtub, this water is supplied to a washing machine by means of a portable pump of small size or a bucket to be utilized as a washing water for clothes.

However, according to the above mentioned method of utilizing the rainwater, there is caused a problem that it is difficult to ensure a place of arranging a storage vessel in the region in which houses are crowded as a city portion. Also, there is a disadvantage of increasing a running cost, because the stored rainwater must be supplied by using the pump.

Moreover, the above mentioned method of utilizing the used water of the bathtub, it requires a much labor, and the ratio of utilizing the used water is not sufficient yet because the water remained in the washing machine which is not utilized as the washing water is discarded.

It is therefore the first object of the present invention to provide a general service water storing equipment in which it can be arranged on relatively narrow space, a water storage capacity can be increased or decreased by increasing or decreasing the capacity of a storage vessel according to the required amount of the general service water, and the stored rainwater can be supplied to the required place as the general service water without a power source such as a pump and the like by utilizing a potential energy of the rainwater in the storage vessel.

It is therefore the second object of the present invention to provide a general service water storing equipment in which the used water of a bathtub can be supplied to the required place as the general service water by storing the used water of the bathtub in a storage vessel by a pump to utilize a potential energy of the used water in the storage vessel, thereby utilizing the used water of the bathtub effectively.

DISCLOSURE OF INVENTION

The construction of the present invention for attaining the above mentioned objects will be explained hereinafter with reference to FIG. 1, FIG. 3, FIGS. 7–14 corresponding to the embodiments of the present invention.

The first general service water storing equipment according to the present invention comprises, as shown in FIG. 1 and FIG. 3, a rainwater passage 14 disposed along a peripheral edge of a roof of a house or a housetop for receiving a rainwater 15 dropping on the roof or the housetop, a plurality of storage portions 11–13 disposed along the vertical direction at positions lower than the rainwater passage 14, a first supply passage 21 for leading the rainwater received in the rainwater passage 14 to the uppermost one 11 of the storage portions 11–13, a second supply passage 22 connected to a lower face or a lower portion of a side face of the uppermost storage portion 11 at one end thereof, and provided with a supply valve 33 at the other end thereof, third supply passages 23 each connected with a lower face or a lower portion of a side face of the storage portion 12, 13 except the uppermost storage portion 11 at one end thereof, and each connected with the second supply passage 22 through a nonreturn valve 43 at the other end thereof, and overflow passages 41 each for leading the rainwater 15 exceeding above a predetermined water level to the storage portion 12, 13 just below the storage portions 11, 12 except the lowermost one 13 of the storage portions 11–13, when the rainwaters 15 received in the storage portions 11, 12 except the lowermost storage portion 13 go up in water level up to the predetermined water level respectively.

The characteristic construction resides in that the nonreturn valve 43 is adapted to prevent the rainwater 15 from flowing into the third supply passage 23 when a pressure on a side of the other end of the third supply passage 23 is not less than a pressure on a side of the one end of the third supply passage 23 and to allow the rainwater 15 to flow from the one end of the third supply passage 23 to the other end thereof when a pressure on a side of the other end of the third supply passage 23 is less than a pressure on a side of the one end of the third supply passage 23.

The second general service water storing equipment according to the present invention comprises, as shown in FIG. 7, a plurality of storage portions 11–13 disposed along the vertical direction, a fourth supply passage 74 connecting the uppermost one 11 of the storage portions 11–13 with a bathtub, a pump 71 disposed in the middle of the fourth supply passage 74 for pumping a used water of the bathtub to the uppermost storage portion 11, a second supply passage 23 connected to a lower face or a lower portion of a side face of the uppermost storage portion 11 at one end thereof, and provided with a supply valve 33 at the other end thereof, third supply passages 23 each connected with a lower face or a lower portion of a side face of the storage portions 12, 13 except the uppermost storage portion 11 at one end thereof, and each connected with the second supply passage 22 through a nonreturn valve 43 at the other end thereof, and overflow passages 41 each for leading the used water exceeding above a predetermined water level to the storage portion 12, 13 just below the storage portions 11, 12 except the lowermost one 13 of the storage portions 11–13, when the used water received in the storage portions 11, 12 except the lowermost storage portion 13 goes up in water level up to the predetermined water level respectively.

The characteristic construction resides in that the nonreturn valve 43 is adapted to prevent the used water from flowing into the third supply passage 23 when a pressure on a side of the other end of the third supply passage 23 is not less than a pressure on a side of the one end of the third supply passage 23, and to allow the used water to flow from the one end of the third supply passage 23 to the other end thereof when a pressure on a side of the other end of the third supply passage 23 is less than a pressure on a side of the one end of the third supply passage 23.

Further, as shown FIG. 1 or FIG. 7, a plurality of the storage portions 11–13 may comprise a plurality of storage vessels, and these storage vessels 11–13 can be stacked in the vertical direction.

Still further, as shown FIG. 8 or FIG. 9, it is preferable that a plurality of the storage portions 81–84, or 111–114 comprise a plurality of storage chambers which are formed by partitioning an inside of a single vertically elongated storage vessel 80, 110 by partition plates 86 or 116 extending substantially in the horizontal direction.

Moreover, as shown in FIG. 9, the second supply passage 122 can be formed into a vertically elongated small chamber by a vertical plate 117 and a side plate 110b of the single storage vessel 110, the vertical plate 117 extending vertically and downwardly from an end edge of the partition plate 116 as a bottom plate of the uppermost storage chamber 111, which end edge of the partition plate 116 is notched.

The third general service water storing equipment according to the present invention comprises, as shown in FIG. 10, a rainwater passage 14 disposed along a peripheral edge of a roof of a house or a housetop for receiving a rainwater 15 dropping on the roof or the housetop, a plurality of storage portions 131–133 disposed at positions lower than the rainwater passage 14 and arranged so as to form in line in the horizontal direction, a first supply passage 141 for leading the rainwater 15 received in the rainwater passage 14 to a first storage portion 131 of a plurality of the storage portions 131–133, a second supply passage 142 connected to a lower face or a lower portion of a side face of the first storage portion 131 at one end thereof, and provided with a supply valve 33 at the other end thereof, a lower portion communicating means 137 for communicating lower portions of a plurality of the storage portions 131–133 in series and in order from the first storage portion 131, nonreturn valves 43 disposed on the lower portion communication means 137 respectively, and an upper portion communication means 138 for communicating upper portions of a plurality of the storage portions 131–133 in series and in order from the first storage portion 131.

The characteristic construction resides in that the valve 43 is adapted to prevent the rainwater 15 from flowing into the lower portion communication means 137 when a pressure on a proximal side to the first storage portion 131 is not less than a pressure on a distal side from the first storage portion 131 and to allow the rainwater 15 to flow toward the first storage portion 131 through the lower portion communication means 137 when a pressure on a proximal side to the first storage portion 131 is less than a pressure on a distal side from the first storage portion 131.

The fourth general service water storing equipment comprises, as shown in FIG. 11, a plurality of storage portions 131–133 arranged so as to form in line in the horizontal direction, a fourth supply passage 74 connecting a first storage portion 131 of the storage portions 131–133 with a bathtub, a pump 71 disposed in the middle of the fourth supply passage 74 for pumping a used water 145 of the bathtub to the first storage portion 131, a second supply passage 142 connected to a lower face or a lower portion of a side face of the first storage portion 131 at one end thereof, and provided with a supply valve 33 at the other end thereof, a lower portion communicating means 137 for communicating lower portions of a plurality of the storage portions 131–133 in series and in order from the first storage portion 131, nonreturn valves 43 disposed on the lower portion 131 communication means 137 respectively, and an upper portion communicating means 138 for communicating upper portions of a plurality of the storage portions 131–133 in series and in order from the first storage portion 131.

The characteristic construction resides in that the nonreturn valve 43 is adapted to prevent the used water 145 from flowing into the lower portion communication means 137 when a pressure on a proximal side to the first storage portion 131 is not less than a pressure on a distal side from the first storage portion 131, and to allow the used water 145 to flow toward the first storage portion 131 when a pressure on a proximal side to the first storage portion 131 is less than a pressure on a distal side from the first storage portion 131.

Moreover, as shown in FIG. 10 or FIG. 11, a plurality of the storage portions 131–133 can comprise a plurality of vertically elongated storage vessels.

Further, as shown in FIG. 12, FIG. 13 or FIG. 14, it is preferable that a plurality of the storage portions 151–154, or 211–214, and 221–223 comprise a plurality of storage chambers which are formed by partitioning an inside of a single storage vessel 150 or 210 through partition plates 156 or 216 extending substantially in the vertical direction.

In the first general service water storing equipment as shown in FIG. 1 and FIG. 3, the rainwater 15 dropping on the roof of the house or the housetop passes through the rainwater passage 14 and the first supply passage 21 and then at first collected in the uppermost storage vessel 11. When the rainwater 15 in the uppermost storage vessel 11 goes up in water level up to over a predetermined water level, the rainwater 15 exceeding over the predetermined water level passes through the overflow passage 41 and then collected in the storage vessel 12 just below the storage vessel 11. In this way, the rainwater 15 is collected in the storage vessels 11–13 in order from the uppermost storage vessel 11.

If the supply valve 33 is opened in the above mentioned state, the rainwater 15 in the storage vessel 11 is first supplied to the destination of supply. At this time, the rainwater 15 is not supplied thereto from the storage vessel 12, 13 except the uppermost storage vessel 11 due to the nonreturn valve 43 disposed on the third supply passage 23. When the rainwater 15 in the uppermost storage vessel 11 is exhausted, the rainwater 15 in the storage vessel 12 just below the storage vessel 11 is supplied to the destination of supply. In this way, the rainwater 15 is supplied to the destination of supply in order from the uppermost storage passage 11 by utilizing the potential energy of the rainwater 15 of respective storage vessels 11–13.

In the second general service water storing equipment as shown in FIG. 7, the operation thereof is the same as the first general service water storing equipment, except that the pump 71 supplies the used water of the bathtub to the uppermost storage vessel 11 of the storage vessels 11–13 through the fourth supply passage 74.

In the third general service water storing equipment, as shown in FIG. 10, the rainwater 15 dropping on the roof of the house or the housetop passes through the rainwater passage 14 and the first supply passage 141 and then first collected in the vertically elongated first storage vessel 131. When the rainwater 15 in the first storage vessel 131 goes up in water level up to over a predetermined water level, the rainwater 15 exceeding over the predetermined water level is collected in the adjacent second storage vessel 132 connected to the first storage vessel through the upper portion communicating means 138. In this way, the rainwater 15 is collected in order from the first storage vessel 131.

If the supply valve 33 is opened in the above mentioned state, the rainwater 15 in the first storage vessel 131 is first supplied to the destination of supply. When the water level of the first storage vessel 131 goes down to come to the same water level as that of the storage vessel 132, 133 except the storage vessel 131, the water levels of these storage vessels 131–133 go down while they are substantially identical with each other. In this way, the rainwater 15 is supplied to the destination of supply by utilizing the potential energy of the rainwater 15 of respective vertically elongated storage vessels 131–133.

In the fourth general service water storing equipment as shown in FIG. 11, the function thereof is the same as that of the first general service water storing equipment, except that the pump 74 supplies the used water 145 of the bathtub to the first storage vessel 131 of the storage vessels 131–133 through the fourth supply passage 71.

BRIEF DESCRIPTION OF THE DRAWING

FIGS. 8 and 8A is a longitudinal section view of a general service water storing equipment of a third embodiment according to the present invention;

BEST MODE FOR CARRYING OUT THE INVENTION

Figure 1:
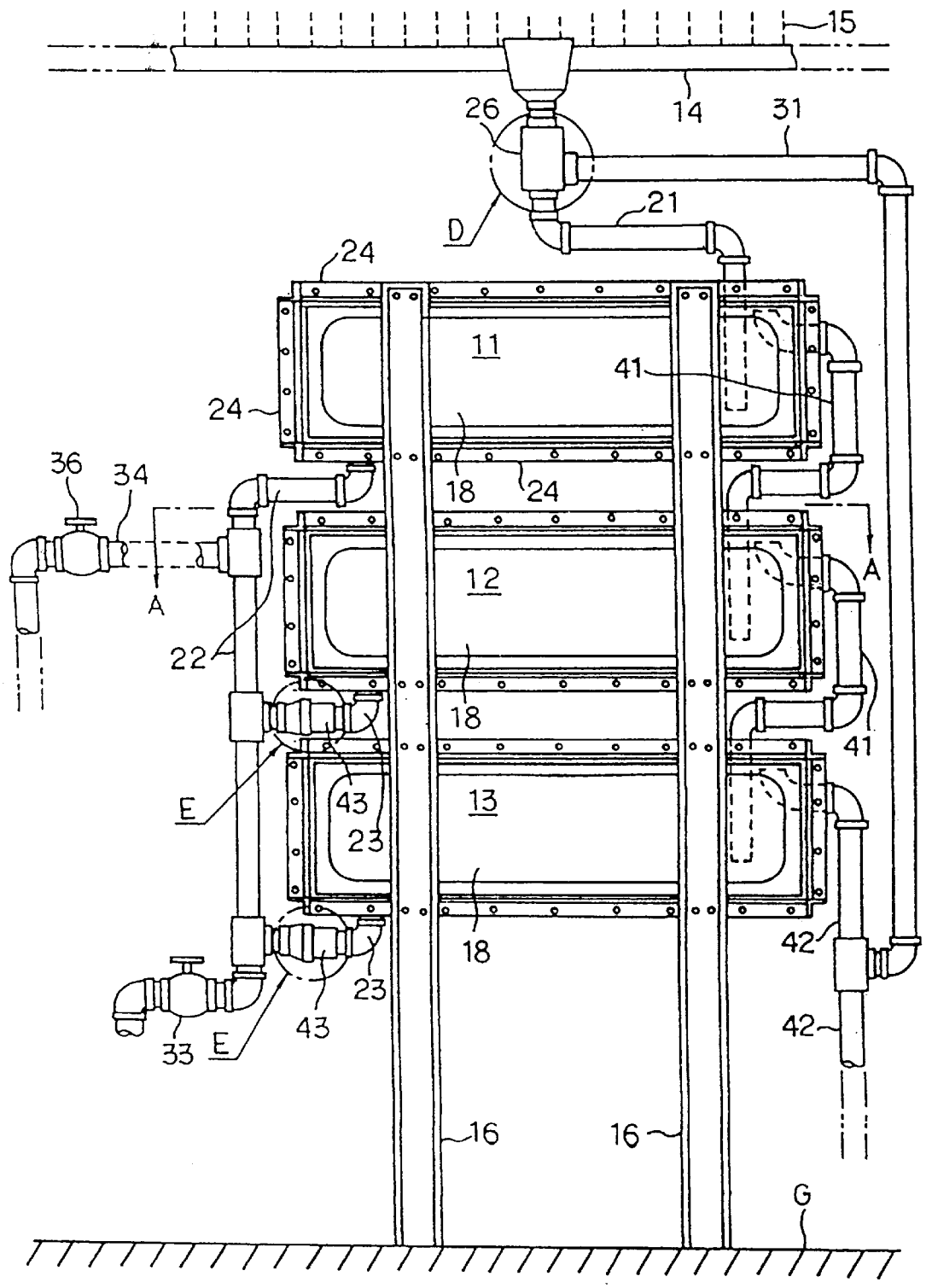
FIG. 1 is a front view of a general service water storing equipment of a first embodiment according to the present invention.

The first embodiment according to the present invention will be described hereinafter with reference to the drawings.

As shown in FIGS. 1–6, a rainwater gutter 14 is disposed along a peripheral edge of a roof of a house, and it receives a rainwater 15 dropping on the roof. The storage portions 11–13 are disposed so as to be stacked in plural at positions lower than the rainwater gutter 14. The number of the stacked storage portions 11–13 is three in this embodiment. Hereinafter, the uppermost storage vessel 11 is referred to as a first storage vessel, the middle storage portion 12 is referred to as a second storage vessel, and the lowermost storage portion 13 is referred to as a third storage vessel.

These storage vessels 11–13 are attached to a plurality of supports 16 at a constant distances (FIG. 1). The supports 16 are disposed vertically on a ground G. The storage vessels 11–13 are formed into a rectangular parallelepiped in this embodiment by connecting a lid plate 17, side plates 18 and a bottom plate 19, which are made of resin, by angle steels 24, and then an inside of the storage vessel is sealed. The support 16 is made from a channel steel in this embodiment.

The rain water 15 received in the rainwater gutter 14 is led to the first storage vessel 11 by a pipe-like first supply passage 21. The first supply passage 21 is connected to the rainwater gutter 14 at an upper end thereof and is inserted into the storage vessel 11 through the lid plate 17 of the first storage vessel 11 at a lower end thereof. A rainwater flow diverter 26 is connected on the middle of the first supply passage 21.

Figure 5:
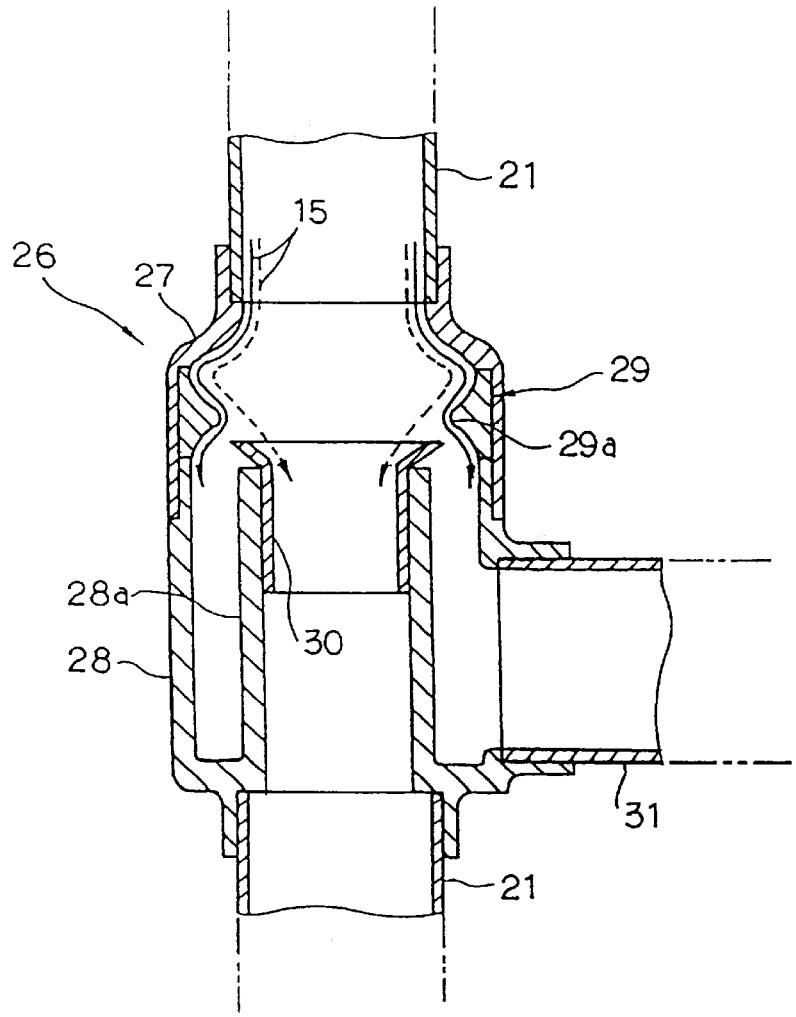
FIG. 5 is an enlarged sectional view of D part of FIG. 1.

The rainwater flow diverter 26, as shown in FIG. 5 in detail, comprises an upper case 27 connected to an upper part of the first supply passage 21, and a lower case 28 connected to the upper case 27 at an upper end thereof and connected to a lower part of the first supply passage 21 at a lower end thereof. An inner circumferential face on a lower portion of the upper case 27 is inserted and attached with a short pipe 29, which is formed with a convex portion 29a protruding toward a center of the short pipe 29. An inner cylinder 28a is disposed in the lower case 28 integrally with the case 28. A funnel 30 is attached to an upper end of the inner cylinder 28a. An upper end of the funnel 30 is positioned at a position lower than the convex portion 29a by a predetermined distance. Moreover, one end of a drain pipe 31 is connected to a lower portion of a circumferential face of the lower case 28. When the amount of the rainwater 15 flowing into the upper part of the first supply passage 21 is a little and includes a plenty of dust adhered to the roof, for example when the rain starts to fall, the rainwater 15 flows as shown by an arrow of a solid line to be led to the drain pipe 31. When the rain falls really and then the amount of the rainwater 15 flowing into the upper part of the first supply passage 21 becomes great, the rainwater 15 flows as shown by an arrow of a dotted line to be led to the lower one of the first supply passage 21. The rainwater 15 including a plenty of the dusts to be led to the rain pipe 31 is led to the sewerage not shown in the drawings through an overflow pipe 42 described later.

A lower face of the bottom plate 19 of the first storage vessel 11 is connected with one end of the pipe-like second supply passage 22, this passage 22 turns aside the second storage vessel 12 and then extends in parallel with the support 16, and vertically and downwardly. Then a supply valve 33 is disposed on the lower end, that is the other end of this passage 22. An extending pipe 34 is connected so as to branch from the middle of the second supply passage, that is substantially the same portion in height as the upper portion of the second storage vessel 12, and the extending pipe 34 is provided with a stop valve 36. The supply valve 33 and the stop valve 36 each is of a manual operated opening and closing valve (FIG. 1).

Figure 2:
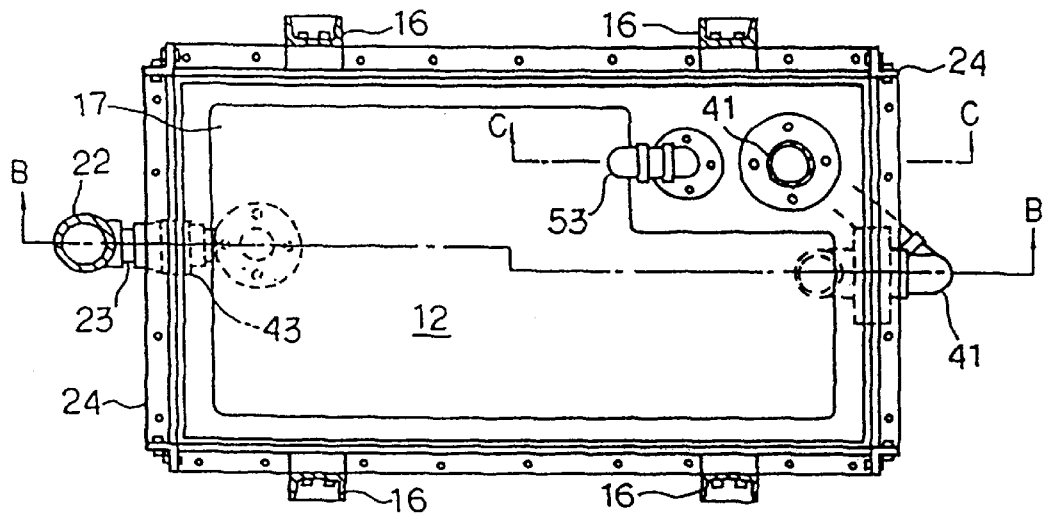
FIG. 2 is a sectional view taken along the line A—A of FIG. 1.
Figure 3:
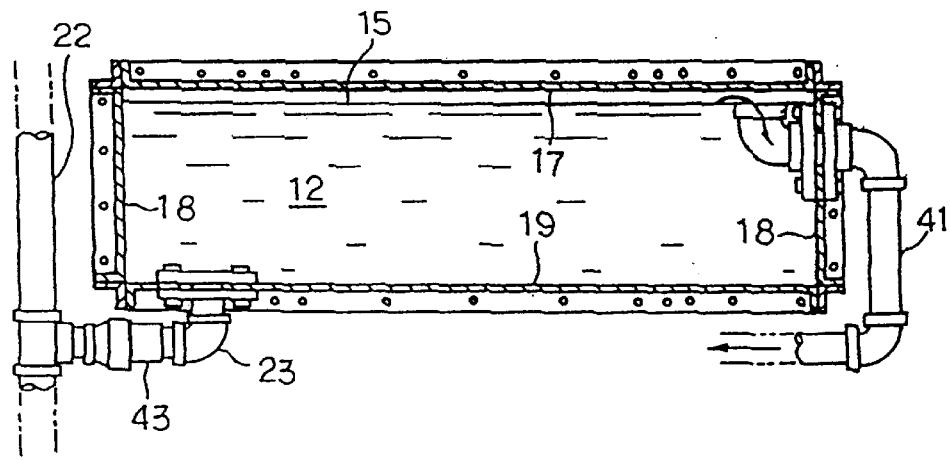
FIG. 3 is a sectional view taken along the line B—B of FIG. 2.

Lower faces of the bottom plates 19 of the second storage vessel 12 and the third storage vessel 13 are connected with one ends of the pipe-like third supply passages 23, 23 respectively, the other ends of these passages 23, 23 are connected to the second supply passage 22 respectively. Nonreturn valves 43, 43 are connected to the middles of the third supply passages 23, 23 respectively (FIGS. 1–3).

Figure 6:
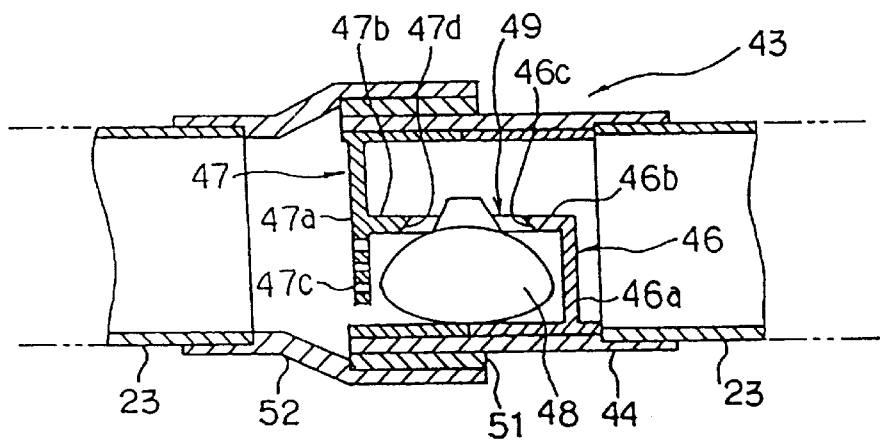
FIG. 6 is an enlarged sectional view of E part of FIG. 1.

The nonreturn valve 43, as shown in FIG. 6, comprises a cylindrical case 44, an upstream side cylindrical member 46 inserted in the case 44 on one end side of the third supply passage 23, that is, in a right side inside of the case 44, and formed with a lower wall 46a closing a lower half of an inside of the case 44, a downstream side cylindrical member 47 inserted in the case 44 on the other end side of the third supply passage 23, that is, in a left side inside of the case 44, and formed with an upper wall 47a closing an upper half of the inside of the case 44, and a float 48 received between the lower wall 46a and the upper wall 47a. A protruding wall 46b is disposed so as to protrude from an upper end of the lower wall 46a toward the upper wall 47a. The upper wall 47a is disposed so as to extend from the upper end to the vicinity of the lower end in the inside of the case 44, a protruding wall 47b is disposed so as to protrude from a substantially center of the upper wall 47a toward the lower wall 46a.

Moreover, a lower portion of the upper wall 47a is formed with a number of holes 47c. A center of a distal end of the protruding wall 46b of the lower wall 46a is formed with a semi-circle like notch 46c, and a center of a distal end of the protruding wall 47b of the upper wall 47a is formed with a semi-circle like notch 47d. These notches 46c, 47d form a circle hole 49 by being abutted at the distal ends of protruding wall 46b, 47b. The float 48 is received between the lower wall 46a and the upper wall 47a below the protruding walls 46a, 47b. When the portion of the case 44 which receives the float 48 is filled with the rainwater, that is, when a pressure on the other end side of the third supply passage 23 is not less than a pressure of one end side of the third supply passage, the float 48 is adapted to rise to close the above mentioned circle hole 49. When the rainwater 15 in the portion of the case 44 which receives the float 48 flows out, that is, when a pressure on the other end side of the third supply passage 23 is less than a pressure of one end side of the third supply passage, the float 48 is adapted to open the above mentioned circle hole 49. The right side end of the case 44 is connected to the third supply passage 23, and the left side end of the case 44 is connected to the third supply passage 23 through the short pipe 51 and a reducer 52.

The first storage vessel 11 and the second storage vessel 12 are connected with each other through a pipe-like overflow passage 41. An upper end of the overflow passage 41 is inserted through the side plate 18 of the first storage vessel 11 and opens upwardly, and a lower end of the overflow passage 41 is inserted through the lid plate 17 of the second storage vessel 12 and opens downwardly. Also, the second storage vessel 12 and the third storage vessel 13 are connected with each other through an overflow passage 41 of the same shape as the above mentioned overflow passage 41. An upper end of this overflow passage 41 is inserted through the side plate 18 of the second storage vessel 12 and opens upwardly, and a lower end of the overflow passage 41 is inserted through the lid plate 17 of the third storage vessel 13 and opens downwardly. The rainwaters 15 stored in the first and second storage vessels 11, 12 go up in water level up to over the predetermined water levels respectively, the rainwaters 15 exceeding over the predetermined water levels are adapted to be led to the second and third storage vessels 12, 13. The third storage vessel is connected with the overflow pipe 42. An upper end of the overflow pipe 42 is inserted through the side plate 18 of the third storage vessel 13 and opens upwardly, and a lower end of the overflow pipe 42 is connected to the sewerage. This overflow pipe 42 is adapted to lead the rainwater 15 exceeding over the predetermined water level to the sewerage when the rainwater 15 stored in the third storage vessel 13 go up in water level up to over the predetermined water level (FIGS. 1–4).

Figure 4:
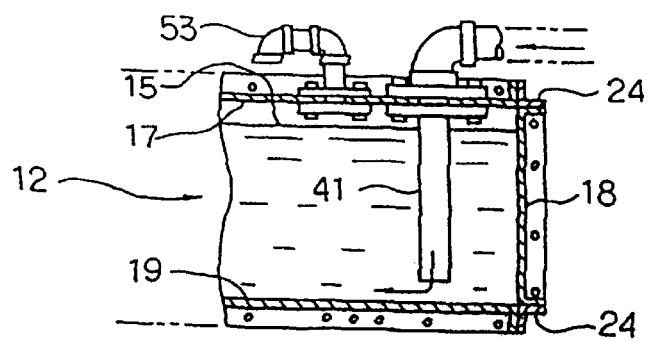
FIG. 4 is a sectional view taken along the line C—C of FIG. 2.

Moreover, the lid plates 17 of the first to third storage vessels 11–14 are connected, as shown in FIGS. 2 and 4 in detail, with a substantially reverse J-shaped air vent pipe 53 exhausting an air in the respective storage vessels 11–13 when the rainwaters 15 in the respective storage vessels 11–13 increase, and introducing an open air into the respective storage vessels 11–13 when the rainwaters 15 in the respective storage vessels 11–13 decrease. The supply passages 21–23, the drain pipes 31, the extending pipe 34, the overflow passage 41, and the overflow pipe 42 and the like each comprises a pipe made of resin such as vinyl chloride, FRP and the like, or a pipe made of metal such as a steel pipe and the like.

In the general service water storing equipment constituted as the above mentioned, the rainwater 15 dropping on the roof of the house passes through the rainwater gutter 14 and the first supply passage 21 and diverted by the rainwater diverter 26, and the rainwater 15 having a relatively small amount of dusts passes through the first supply passage 21 and collected in the first storage vessel 11. At this time, the rainwater 15 in the first storage vessel 11 is stopped by the nonreturn valves 43, 43 disposed on the second supply passages 23, 23 not to flow into the second and third storage vessels 12, 13. When the rainwater 15 stored in the first storage vessel 11 goes up in water level up to over the predetermined water level, the rainwater 15 exceeding over the predetermined water level passes through the overflow passage 41 of the first storage vessel 11 and is collected in the second storage vessel 12 just below the storage vessel 11. When the rainwater 15 in the second storage vessel 12 goes up in water level up to over the predetermined water level, the rainwater 15 exceeding over the predetermined water level passes through the overflow passage 41 of the second storage vessel 12 and is collected in the third storage vessel 13. When the rainwater 15 in the third storage vessel 13 goes up in water level up to over the predetermined water level, the rainwater 15 exceeding over the predetermined water level passes through the overflow pipe 42 discharged to the sewerage not shown in the drawings. In this way, the rain water is collected therein in the order of the uppermost first storage vessel 11, the middle second storage vessel 12, and the third storage vessel 13.

Moreover, when the supply valve 33 is opened, at first the rainwater 15 of the first storage vessel 11 passes through the second supply passage 22 and is supplied to the objective of supply not shown in the drawing such as a garden, a garage, a toilet and the like, and then is utilized as a general service water such as a sprinkle water over a garden, a washing water for a car, a flushing water for a toilet and the like. At this time, even if the rainwater 15 is collected in the second storage vessel 12 and the third storage vessel 13, since the pressure on the other end side of the third supply passage 23 is not less than the pressure on one end side of the third supply passage 23, there is maintained a condition that the float 48 of the nonreturn valve 43 closes the circle hole 49, so that the rainwater 15 in the second storage vessel 12 and the third storage vessel 13 does not flow into the second supply passage 22 through the third supply passage 23. When the rain water 15 in the first storage vessel 11 is exhausted, the pressure on the other end side of the third supply passage 23 connected to a lower face of the second storage vessel 12 turns out to be less than the pressure on one end side of the third supply passage 23, so that the float 48 of the nonreturn valves 43 on this passage 23 descends to open the circle hole 49, and then the rainwater 15 in the second storage vessel 12 is supplied to the designation of supply. When the rainwater 15 in the second storage vessel 12 is exhausted, the rainwater 15 in the third storage vessel 13 is supplied to the destination of supply. In this way, by utilizing the potential energy of the rainwaters 15 in the respective storage vessels 11–13, the rainwaters 15 are supplied to the destination of supply in the order of the uppermost first storage vessel 11, the middle second storage vessel 12, and the lowermost third storage vessel 13.

Further, if the supply valve 33 is closed and the stop valve 36 is opened in a condition that the rainwater 15 is collected in the first storage vessel 11., the rainwater 15 in the first storage vessel 11 is supplied to a place apart from the storage vessels 11–13 by utilizing the potential energy of the rainwater 15.

Figure 7:
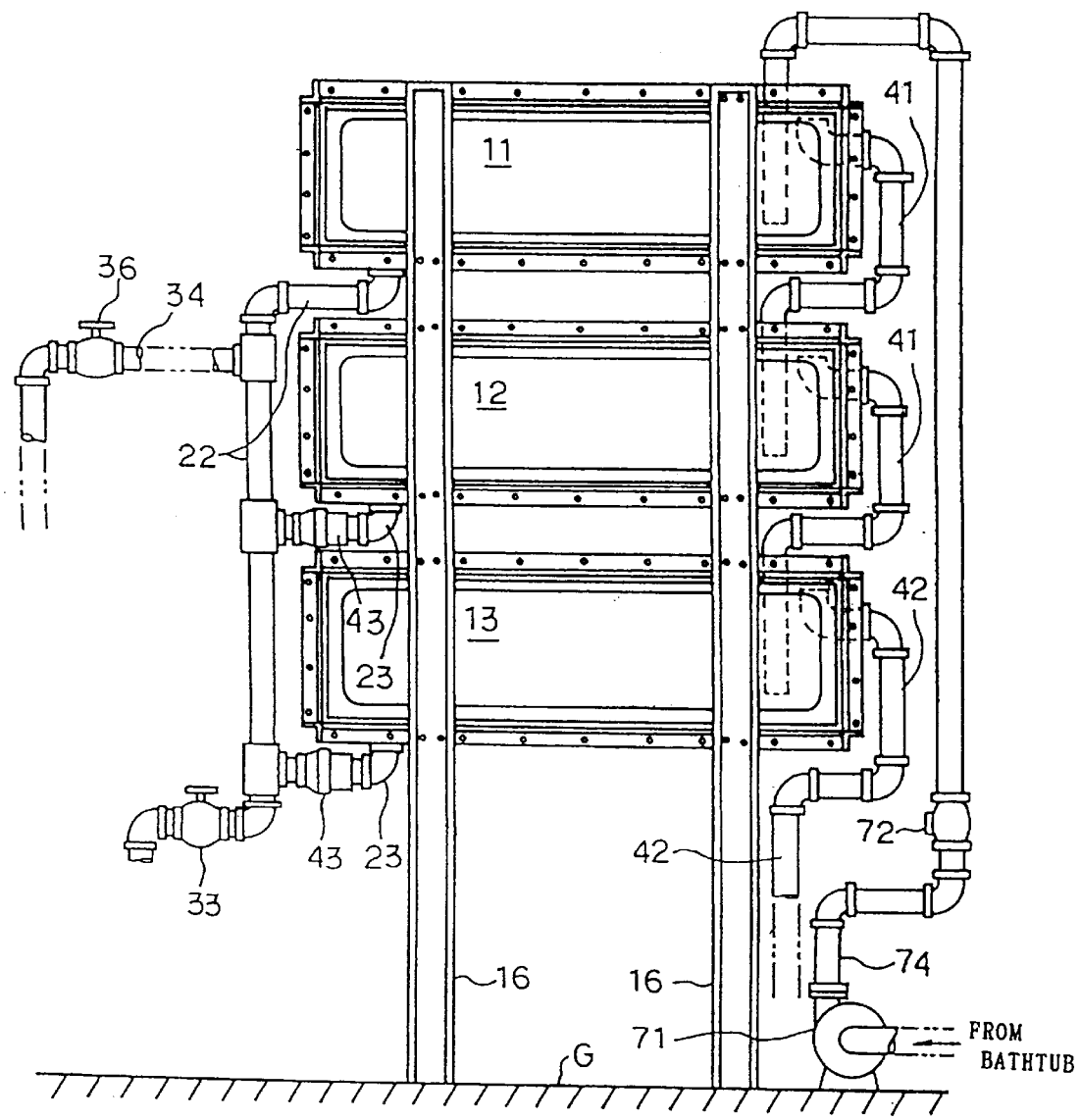
FIG. 7 is a front view of a general service water storing equipment of a second embodiment according to the present invention, corresponding to FIG. 1.

FIG. 7 shows a second embodiment of the present invention. In FIG. 7, the same reference number as that of FIG. 1 shows the same component.

In this embodiment, the uppermost storage vessel 11 of the storage vessels 11–13 stacked in plural in the vertical direction, and the bathtub (not shown in the drawing) are connected through the pipe-like fourth supply passage 74, and the pump 71 and the check valve 72 are disposed on the middle of the fourth supply passage 74. The check valve 72 is adapted to allow the used water to flow from the bathtub to the storage vessel 11, and to forbid the used water to flow from the storage vessel 11 to the bathtub.

The operation of the general service water storing equipment constructed as mentioned above is the same as that of the first embodiment described above except that the pump 71 supplies the used water of the bathtub to the uppermost storage vessel 11 of the storage vessels 11–13 through the fourth supply passage 74, so that the repeat explanation will be omitted.

Figure 8:
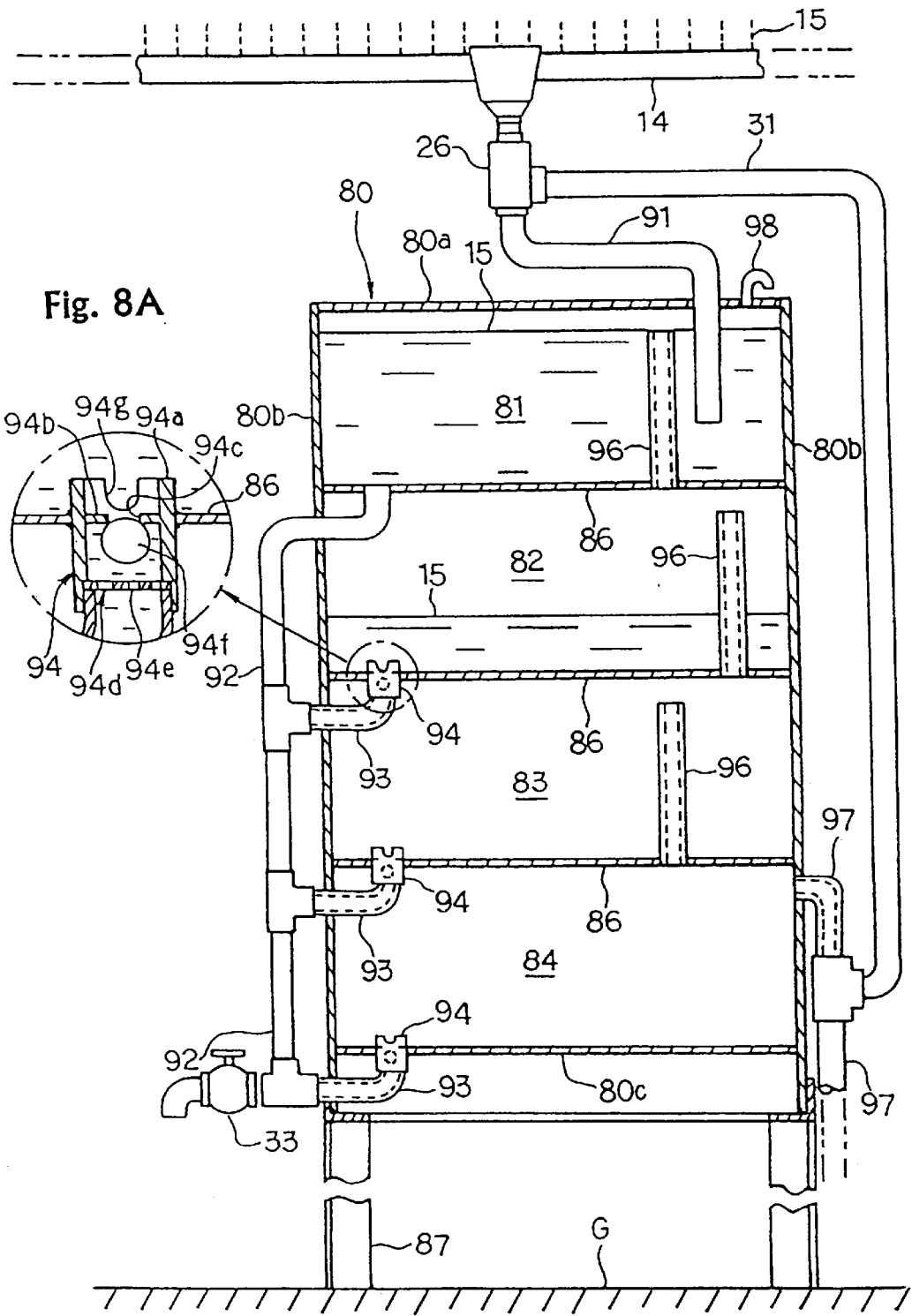

FIG. 8 shows a third embodiment of the present invention. In FIG. 8, the same reference number as that of FIG. 1 shows the same component.

In this embodiment, a single storage vessel 80 is disposed at a position lower than the rainwater gutter 14, an inside of the storage vessel 80 is partitioned into four storage chambers 81–84 by three partition plates 86 extending in the substantially horizontal direction. Hereinafter, the four storage chambers 81–84 are referred to as a first storage chamber 81, a second storage chamber 82, a third storage chamber 83 and a fourth storage chamber 84, respectively, in order from above. These storage chambers 81–84 are mounted on a support 87 disposed vertically on the ground G. The single storage vessel 80 is formed into a rectangular parallelepiped by a lid plate 80a, side plates 80b and a bottom plate 80c, and an inside of the single storage vessel 80 is sealed. The rainwater 15 received in the rainwater gutter 14 is led to the first storage chamber 81 through the first supply passage 91. An upper end of the first supply passage 91 is connected to the rainwater gutter 14, a lower end of the first supply passage 91 is inserted into the first storage chamber 81 through the lid plate 80a of the single storage vessel 80. The rainwater diverter 26 is connected on the middle of the first supply passage 91.

An lower face of the partition plate 86 as the bottom plate of the first storage chamber 81 is connected with one end of the second supply passage 92, this passage 92 protrudes out of the storage vessel 80 and then extends vertically and downwardly. A lower end as the other end of the passage 92 is provided with a supply valve 33. Lower faces of the partition plates 86, 86 as the bottom plates of the second storage chamber 82 and the third storage chamber 83, and lower face of the bottom plate 80c of the single storage vessel 80 as the bottom plate of the fourth storage chamber 84 are connected with one ends of the pipe-like third supply passages 93 respectively, the other ends of these passages 93 are connected with the second supply passages 92 respectively. The nonreturn valves 94 are disposed on one ends of the third supply passage 93. An upper end of the nonreturn valve 94 defines one end of the third supply passage 93. The nonreturn valve 94 comprises a cylindrical case 94a, a protruding wall 94b disposed so as to protrude inside the case 94a in the horizontal direction and having a circle hole 94c, a perforated plate 94d inserted into a lower portion of the case 94a and having a plurality of holes 94e, and a spherical float 94f inserted loosely between the protruding wall 94a and the perforated plate 94d. When the portion of the case 94a which receives the float 94f is filled with the rainwater 15, that is, when a pressure on the other end side of the third supply passage 93 is not less than a pressure on one end side of the third supply passage 93, the float 94f is adapted to rise to close the above mentioned circle hole 94c. When the rainwater 15 in the portion of the case 94a which receives the float 94f flows out, that is, when a pressure on the other end side of the third supply passage 93 is less than a pressure of one end side of the third supply passage 93, the float 94d is adapted to abut to the perforated plate 94d to open the above mentioned circle hole 94c. An upper end of the nonreturn valve 94 is formed with a notch 94g in order to obstruct that the rainwater 15 in the storage chambers 82–84 are not supplied to the destination of supply and then remain at the bottoms of the storage chambers 82–84.

Pipe-like overflow passages 96 are disposed vertically on the partition plates 86 as the respective bottom plates of the first to third storage chambers 81–83. When the rainwaters 15 stored in the storage chambers 81–83 go up in water level up to over the predetermined water levels respectively, the rainwaters 15 exceeding over the predetermined level are adapted to be led to the second to fourth storage chambers 82–84 respectively. An upper part of the portion of the side plate 80b of the single storage vessel 80 which forms the fourth storage chamber 84 is connected with one end of the overflow pipe 97, and the other end of the overflow pipe 97 is connected with the sewerage (not shown in the drawings). This overflow pipe 97 is adapted to lead the rainwater 15 exceeding over the predetermined water level to the sewerage, when the rainwater 15 received in the storage chamber 84 goes up in water level up to over the predetermined water level. Moreover, the lid plate 80a of the single storage vessel 80 is connected with a substantially reverse J-shaped air vent pipe 98 for exhausting an air inside the respective storage chambers 81–84 when the rainwaters 15 inside the respective storage chambers 81–84 increase, and for leading an open air into the respective storage chambers 81–84 when the rainwaters 15 inside the respective storage chambers 81–84 decrease. The single storage vessel 80 and the partition plate 86 each comprises a plate made of resin such as vinyl chloride, FRP and the like, or a plate made of metal such as a steel plate and the like.

The operation of the general service water storing equipment constructed as mentioned above is the same as that of the first embodiment described above, so that the repeat explanation will be omitted.

Figures 9, 9A:
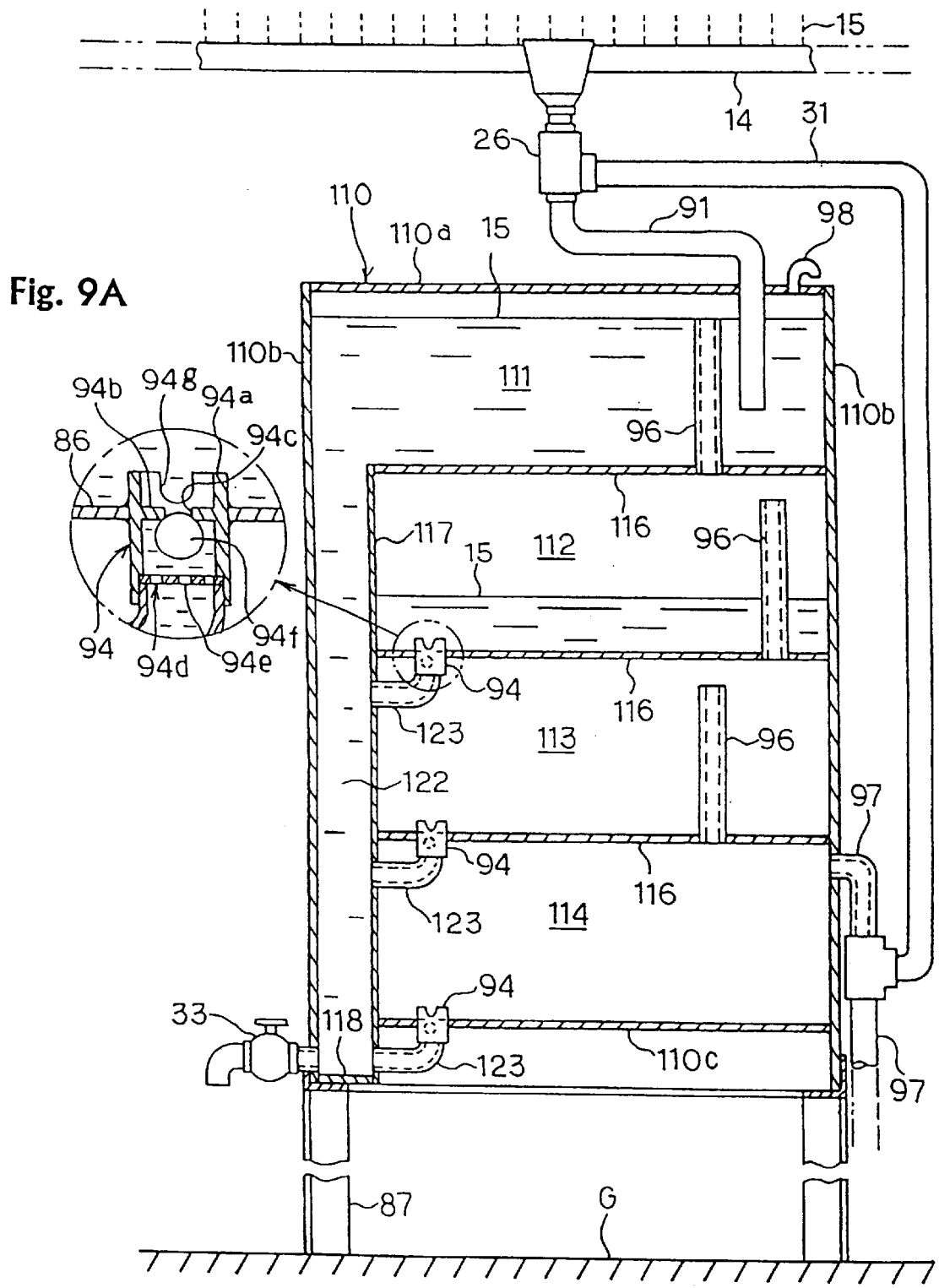
FIGS. 9 and 9A is a longitudinal section view of a general service water storing equipment of a fourth embodiment according to the present invention, corresponding to FIG. 8.

FIG. 9 shows a fourth embodiment of the present invention. In FIG. 9, the same reference number as that of FIG. 8 shows the same component.

In this embodiment, the second supply passage 122 is formed into a longitudinally elongated small chamber by a vertical plate 117 and a side plate 110b of a single storage vessel 110, which vertical plate 117 extending vertically and downwardly from an end edge of the partition plate 116 as the bottom plate of the storage chamber 111 down to above a support 87, which end edge of the partition plate 116 is notched. A lower end of the second supply passage 122 is prevented from a leak of the rainwater 15 by the closing plate 118. The supply valve 33 is connected to a lower portion of the side plate 110*b* of the single storage vessel 110 which forms the second supply passage 122, and the other ends of the third supply passages 123 are connected to the vertical plate 117 respectively. The lid plate 110*a* of the single storage vessel 110 is connected to a substantially reverse J-shaped air vent pipe 98.

The operation of the general service water storing equipment constructed as mentioned above is the same as that of the third embodiment described above, so that the repeat explanation will be omitted.

Figure 10:
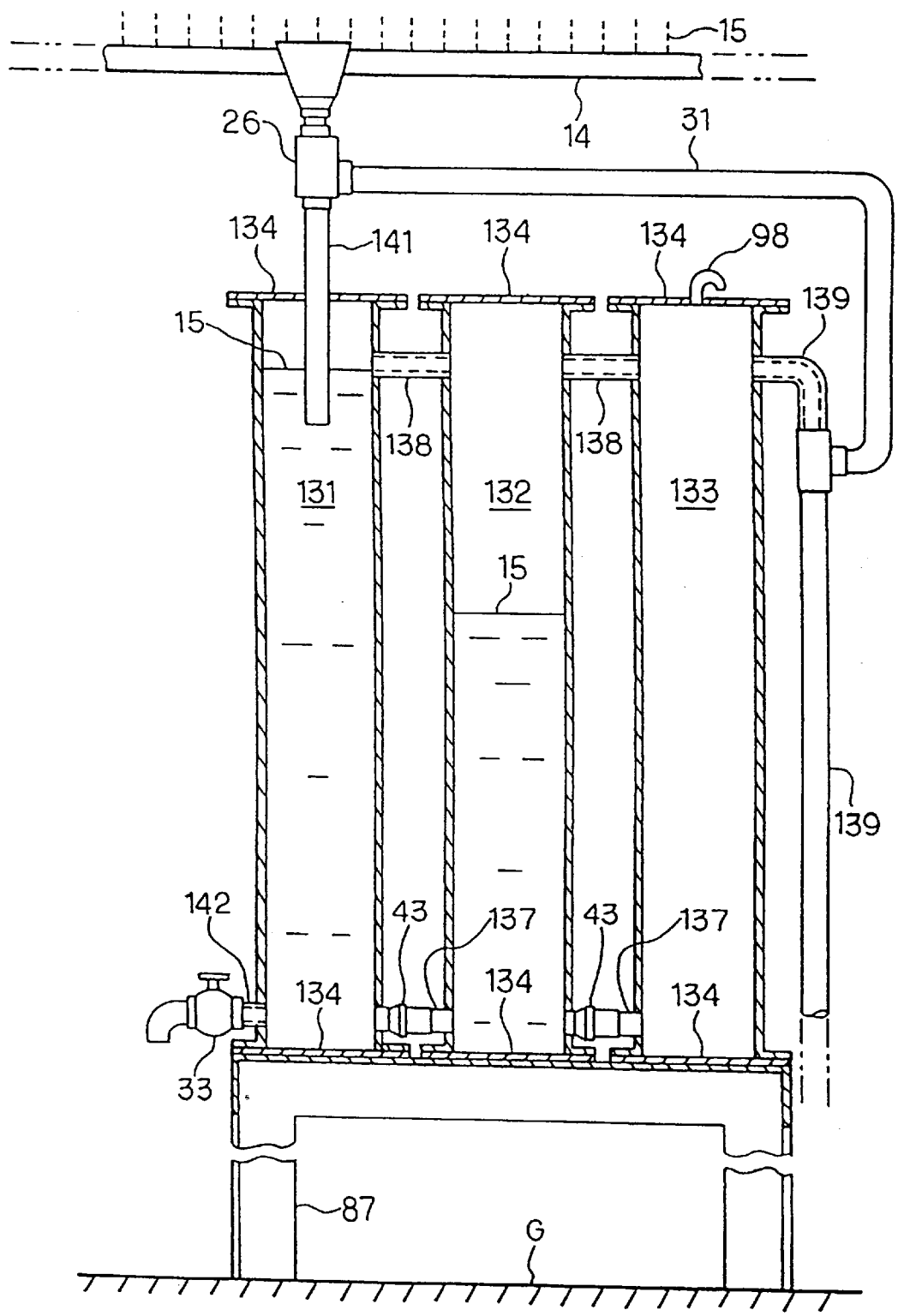
FIG. 10 is a longitudinal section view of a general service water storing equipment of a fifth embodiment according to the present invention, corresponding to FIG. 8.

FIG. 10 shows a fifth embodiment of the present invention. In FIG. 10, the same reference number as that of FIG. 1 shows the same component.

In this embodiment, three longitudinally elongated storage vessels 131–133 are arranged at positions lower than the rainwater gutters 14 so as to form in line in the horizontal direction. Hereinafter, these three storage vessels 131–134 are referred to as a first storage vessel 131, a second storage vessel 132 and a third storage vessel 133 in order from the left. These storage vessels 131–133 is mounted on the support 87 disposed vertically on the ground G. These storage vessels 131–133 each is formed by a large diameter pipe made of resin such as vinyl chloride, FRP and the like, or a pipe made of metal such as a steel pipe and the like. Insides of the storage vessels 131–133 are sealed, upper ends and lower ends of which are attached with blind flanges 134, 134 respectively. The rainwater 15 received in the rainwater gutter 14 is led to the first storage vessel 131 through the first supply passage 141. An upper end of the first supply passage 141 is connected to the rainwater gutter 14, a lower end of the first supply passage 141 is inserted into the storage vessel 131 through the blind flange 134 as the lid of the first storage vessel 131. The rainwater diverter 26 is connected on the middle of the first supply passage 141.

A lower portion of the side face of the first storage vessel 131 is connected with one end of the second supply passage 142, and the other end of the second supply passage 142 is provided with the supply valve 33. A lower portion of the side face of the first storage vessel 131 and a lower portion of the side face of the second storage vessel 132 are connected so as to communicate to each other by a lower portion communicating means 137, and a lower portion of the side face of the second storage vessel 132 and a lower portion of the side face of the third storage vessel 133 are connected so as to communicate with each other by the lower portion communicating means 137. These lower portion communicating means 137 each comprises a pipe in this embodiment, the nonreturn valve 43 having the same construction as that of the first embodiment is disposed on the middle of each of these lower portion communicating means 137. The nonreturn valve 43 is adapted to prevent the rainwater 15 from flowing into the lower portion communicating means 137 when one of the both side pressures of the nonreturn valve 43 on a proximal side to the first storage vessel 131 is not less than the other of the both side pressures on a distal side from the first storage vessel 131, and is adapted to allow the rainwater 15 to flow into the lower portion communicating means when one of the both side pressures of the nonreturn valve 43 on the proximal side to the first storage vessel 131 is less than the other of the both side pressures on the distal side to the first storage vessel 131.

An upper portion of the side face of the first storage vessel 131 and an upper portion of the side face of the second storage vessel 132 are connected so as to communicated with each other by the upper portion communicating means 138, and an upper portion of the side face of the second storage vessel 132 and an upper of the side face of the third storage vessel 133 are connected so as to communicate with each other by the upper portion communicating means 138. These upper portion communicating means 138 each comprises a pipe in this embodiment. When the rainwaters 15 stored in the first storage vessel 131 and the second storage vessel 132 go up in water level up to over the predetermined water level respectively, the rainwater 15 exceeding over the predetermined water level is led to the second and third storage vessels 132, 133. An upper portion of the side face of the third storage vessel 133 is connected to one end of the overflow pipe 139, the other end of the overflow pipe 139 is connected to the sewerage (not shown in the drawings). This overflow pipe 139 is adapted to lead the rainwater 15 exceeding over the predetermined water level to the sewerage when the rainwater 15 stored in the third storage vessel 133 go up in water level up to the predetermined water level. Also, the blind flange 134 as the lid of the third storage vessel 133 is connected with a substantially reverse J-shaped air vent pipe 98.

In the general service storing equipment constructed as mentioned above, the rainwater 15 dropping on the roof of the house passes through the rainwater gutter 14 and the first supply passage 141 and then to be diverted by the rainwater diverter 26, and the rainwater 15 having a relatively small amount dusts passes through the first supply passage 141 and then is collected in the first storage vessel 131.

At this time, the rainwater 15 in the first storage vessel 131 is stopped by the nonreturn valve 43 disposed on the lower portion communicating means 137 between the first and second storage vessels 131, 132 thereby not to flow into the second storage vessel 132. When the rainwater 15 stored in the first storage vessel 131 go up in water level up to over the predetermined water level, the rainwater 15 exceeding over the predetermined water level passes through the upper portion communicating means 138 between the first and second storage vessels 131, 132 to be collected in the second storage vessel 132. When the rainwater 15 stored in the second storage vessel 132 go up in water level up to over the predetermined water level, the rainwater 15 exceeding over the predetermined water level passes through the upper portion communicating means 138 between the second and third storage vessels 132, 133 to be collected in the third storage vessel 133. When the rainwater 15 in the third storage vessel 133 go up in water level up to over the predetermined water level, the rainwater 15 exceeding over the predetermined level passes through the overflow pipe 139 to discharge to the sewerage not shown in the drawing. In this way, the rainwater 15 is collected in the first storage vessel 131, the second storage vessel 132, and the third storage vessel 133 in order from the left.

Furthermore, if the supply valve 33 is opened, at first the rainwater 15 in the first storage vessel 131 is supplied to the garden, the garage and the toilet and the like through the second supply passage 142, and then utilized as a general service water such as a sprinkle water over a garden, a washing water for a car, a flushing water for a toilet and the like. When the water level of the first storage vessel 131 goes down in water level to a level slightly lower than the water level of the second storage vessel 132, a pressure on a side of the second storage vessel 132 with respect to the nonreturn valve 43 disposed on the lower portion communicating means 137 between the first and second storage vessel 131, 132 becomes slightly greater than a pressure on a side of the first storage vessel 131, so that the rainwater 15 stored in the second storage vessel 132 flows into the first storage vessel 131 through the lower portion communicating means 137. As a result, the water levels of the first and second storage vessels 131, 132 go down while they are substantially identical with each other. In this way, the rainwater 15 is supplied to the destination of supply by utilizing the potential energy of the rainwater 15 of the respective longitudinally elongated storage vessels 131–133.

Figure 11:
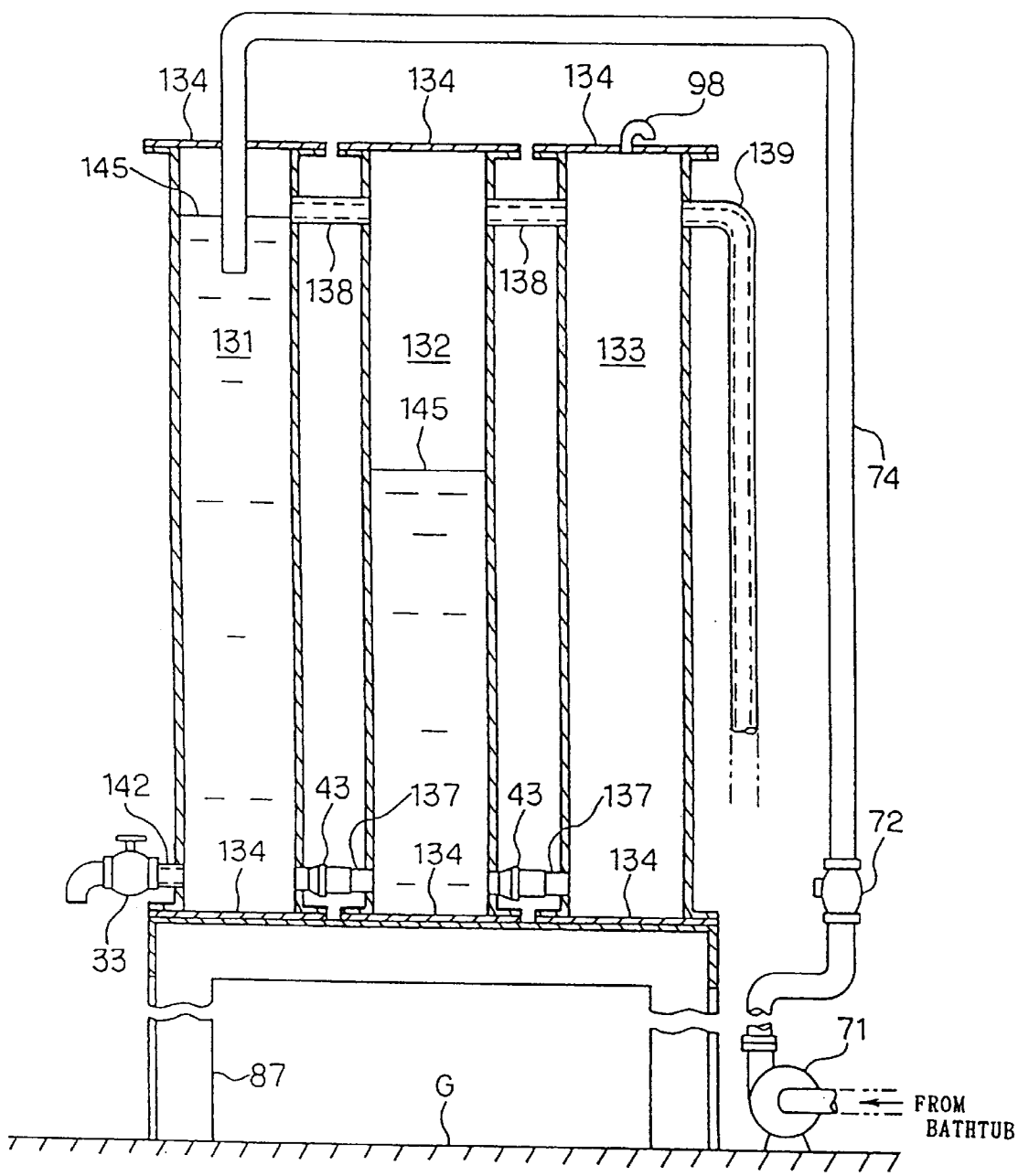
FIG. 11 is a longitudinal section view of a general service water storing equipment of a sixth embodiment according to the present invention, corresponding to FIG. 8.

FIG. 11 shows a sixth embodiment of the present invention. In FIG. 11, the same reference number as that of FIG. 10 shows the same component.

In this embodiment, the first storage vessel 131 which is one of a plurality of the storage vessels 131–133 arranged so as to form in line in the horizontal direction and the bathtub (not shown in the drawings) are connected with each other by the pipe-like fourth supply passage 74, and the pump 71 and the check valve 72 are disposed on the middle of the fourth supply passage 74. The check valve 72 is adapted to allow the used water 145 to flow from the bathtub to the storage vessel 131, and to forbid the used water 145 to flow the storage vessel 131 to the bathtub.

The operation of the general service water storing equipment constructed as mentioned above is the same as that of the fifth embodiment described above except that the pump 71 supplies the used water 145 of the bathtub to the first storage vessel 131 through the fourth supply passage 74, so that the repeat explanation will be omitted.

Figure 12:
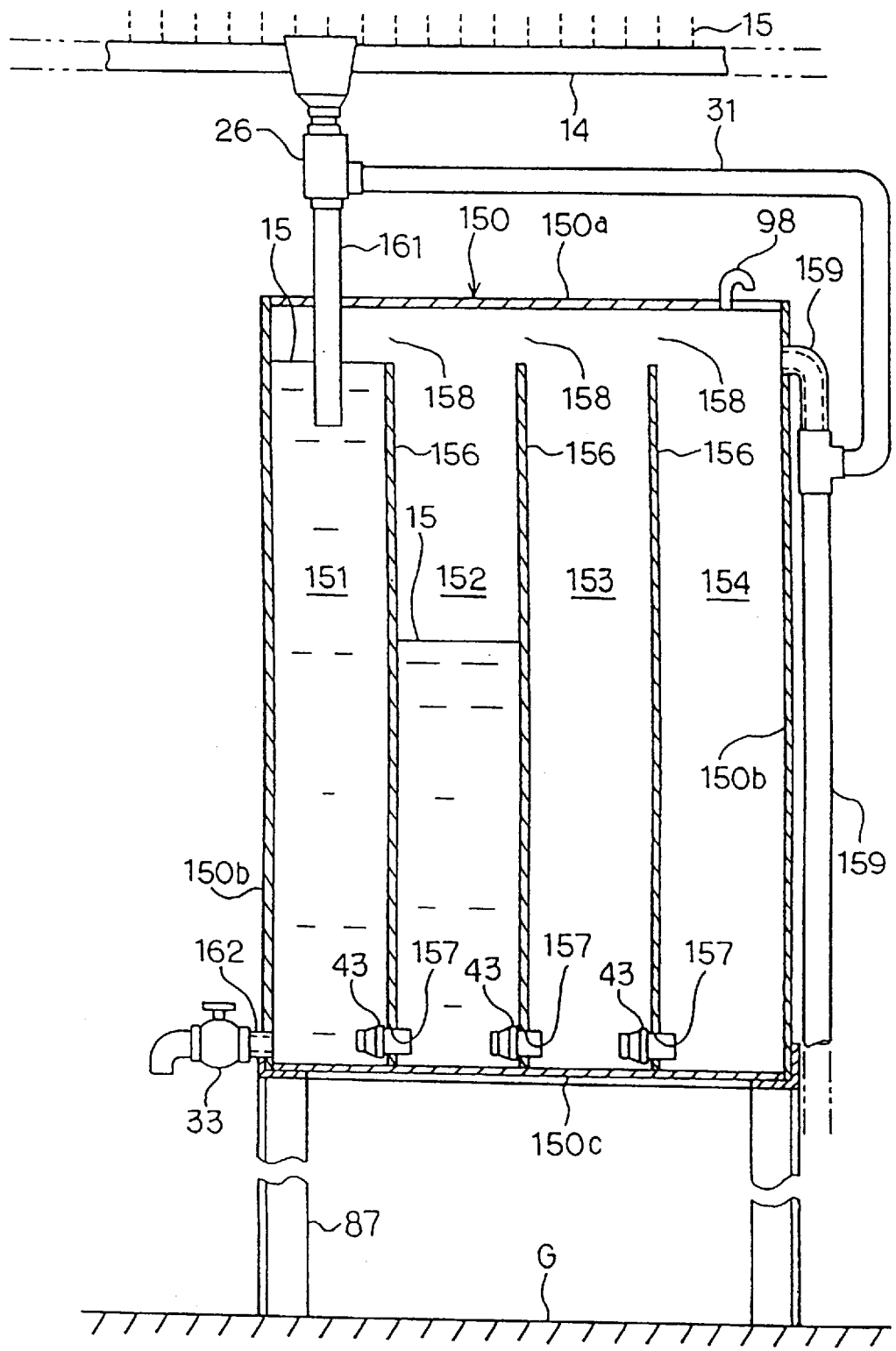
FIG. 12 is a longitudinal section view of a general service water storing equipment of a seventh embodiment according to the present invention, corresponding to FIG. 8.

FIG. 12 shows a seventh embodiment of the present invention. In FIG. 12, the same reference number as that of FIG. 10 shows the same component.

In this embodiment, a single storage vessel 150 is disposed at a position lower than the rainwater gutter 14, and an inside of this storage vessel 150 is partitioned into four longitudinally elongated storage chambers 151–154 by three partition plates 156 extending substantially in the vertical direction. Hereinafter, the four storage chambers 151–154 are refereed to as a first storage chamber 151, a second storage chamber 152, a third storage chamber 153 and a fourth storage chamber 154 in order from the left. These storage chamber 151–154 are mounted on a support 87 disposed vertically on the ground G. A lid plate 150a, side plates 150b and a bottom plate made 150c are connected into a rectangular parallelepiped to form a single storage vessel 150, an inside of which is sealed. The rain water 15 received in the rainwater gutter 14 is led to the first storage chamber 151 by the first supply passage 161. The first supply passage 161 is connected to the rainwater gutter 14 at an upper end thereof and is inserted into the first storage chamber 151 through the lid plate 150a at an lower end thereof. A rainwater diverter 26 is connected on the middle of the first supply passage 161.

A portion of a side plate 150b of the single storage vessel 150 for forming the first storage chamber 151 is connected to one end of the second supply passage 162 at a lower portion thereof, and this passage 162 is provided with a supply valve 33 at the other end thereof. The lower portion communicating means 157 are disposed on the lower portions of three partition plates 156 respectively. The lower portion communicating means 157 comprises a through hole in this embodiment. These lower portion communicating means 157 is inserted with a nonreturn valve 43 which has the same construction as that of the first embodiment. The nonreturn valve 43 is adapted to prevent the rainwater 15 from flowing into the lower portion communicating means 157 when one of the both side pressures of the nonreturn valve 43 on a proximal side to the first storage vessel 151 is not less than the other of the both side pressures on a distal side to the first storage vessel 151, and is adapted to allow the rainwater 15 to flow into the lower portion communicating means when one of the both side pressures of the nonreturn valve 43 on a proximal side to the first storage vessel 151 is less than the other of the both side pressures on a distal side from the first storage vessel 151.

An upper portion communicating means 158 is formed by leaving a predetermined space between the upper end of three partition plates 156 and the lid plate 150a for communicating the respective storage chambers 151–154. These upper portion communicating means 158 are adapted to lead the rainwater 15 exceeding over the predetermined water level to the second to fourth storage chambers 152–154 respectively when the rainwaters 15 stored in the first to third storage chambers 151–153 go up in water level up to over the predetermined water level. A portion of the side plate 150b of the single storage vessel 150 for forming the fourth storage chamber 154 is connected with one end of the overflow pipe 159 at an upper end thereof, the overflow pipe 159 is connected to the sewerage (not shown in the drawing) at the other end thereof. This overflow pipe 159 is adapted to lead the rainwater 15 exceeding over the predetermined water level, when the rainwater 15 stored in the fourth storage chamber 154 go up in water level up to over the predetermined water level. Further, the lid plate 150a of the single storage vessel 150 is connected to the substantially reverse J-shaped air vent pipe 98.

The operation of the general service water storing equipment constructed as mentioned above is the same as that of the fifth embodiment described above, so that the repeat explanation will be omitted.

Figures 13, 13A:
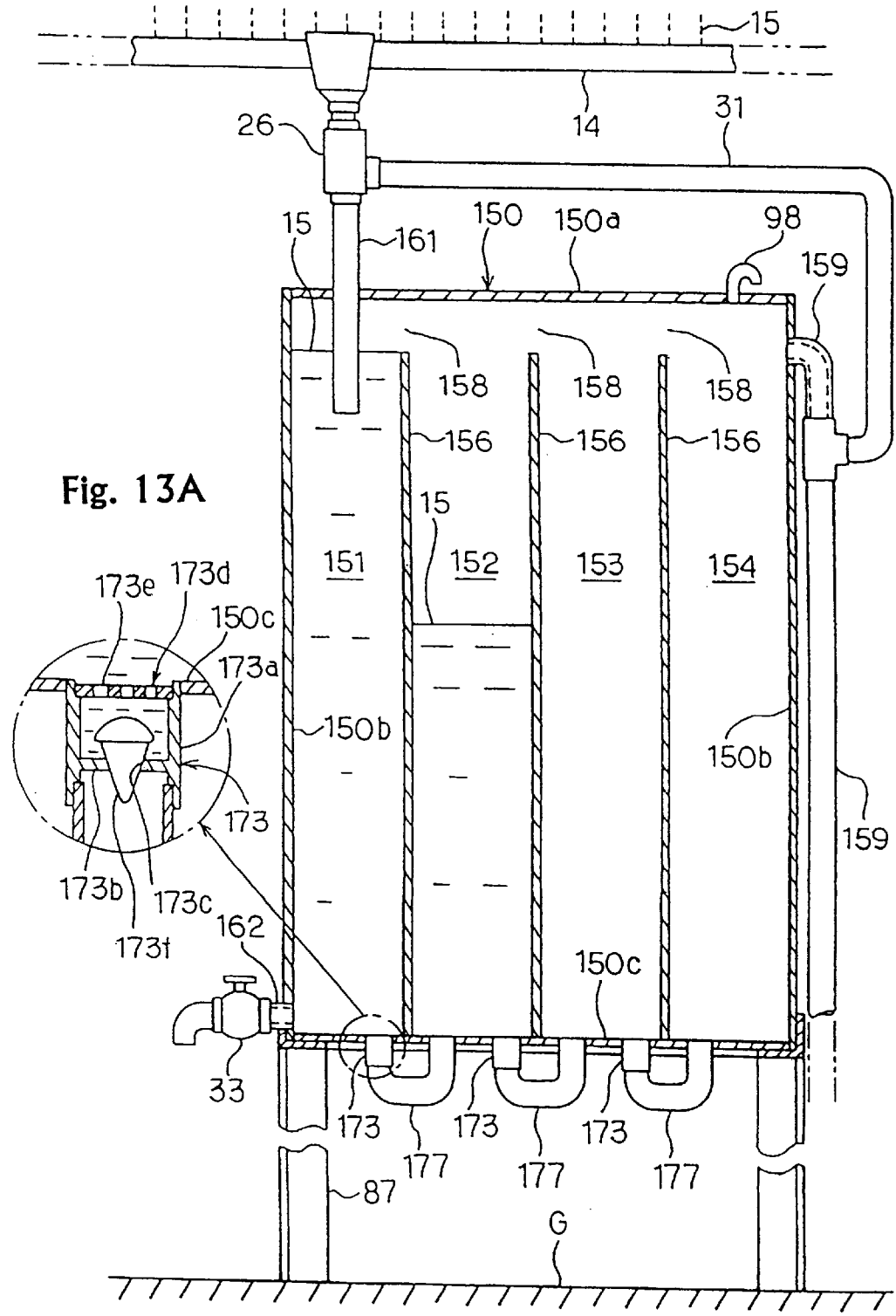
FIG. 13 is a longitudinal section view of a general service water storing equipment of an eighth embodiment according to the present invention, corresponding to FIG. 8.

FIG. 13 shows an eighth embodiment of the present invention. In FIG. 13, the same reference number as that of FIG. 12 shows the same component.

In this embodiment, the lower portion communicating means 177 comprises a substantially U-shaped pipe connected to the bottom plate 150c at both ends thereof so as to communicate between respective adjacent storage chambers 151–154. The communicating means 177 are provided with a nonreturn valve 173 at a proximal end thereof to the first storage chamber 151. The nonreturn valve 173 comprises a cylindrical case 173a, a protruding wall 173b disposed so as to protrude inside the case 173a in the horizontal direction and having a circle hole 173c at a center thereof, a perforated plate 173d inserted into an upper end of the case 173a and having a number of holes 173e, and a substantially conical valve body f inserted loosely between the protruding wall 173b and the perforated plate 173d and being slightly greater in specific gravity than the rainwater 15. The nonreturn valve 173 is adapted to prevent the rainwater 15 from flowing into the lower portion communicating means 177 toward the first storage vessel 151 when a pressure on an upper side of the valve body 173f is not less than a pressure on a lower side of the valve body 173f, that is, a pressure on a, proximal side to the first storage chamber 151 with respect to the nonreturn valve 173 is not less than a pressure on a distal side from the first storage vessel 151, to allow the rainwater 15 from flowing into the lower portion communicating means 177 toward the first storage vessel 151 when a pressure on an upper side of the valve body 173f is not less than a pressure on a lower side of the valve body 173f, that is, a pressure on a proximal side to the first storage chamber 151 with respect to the nonreturn valve 173 is less than a pressure on a distal side of the first storage vessel 151.

The operation of the general service water storing equipment constructed as mentioned above is the same as that of the seventh embodiment described above, so that the repeat explanation will be omitted.

Figure 14:
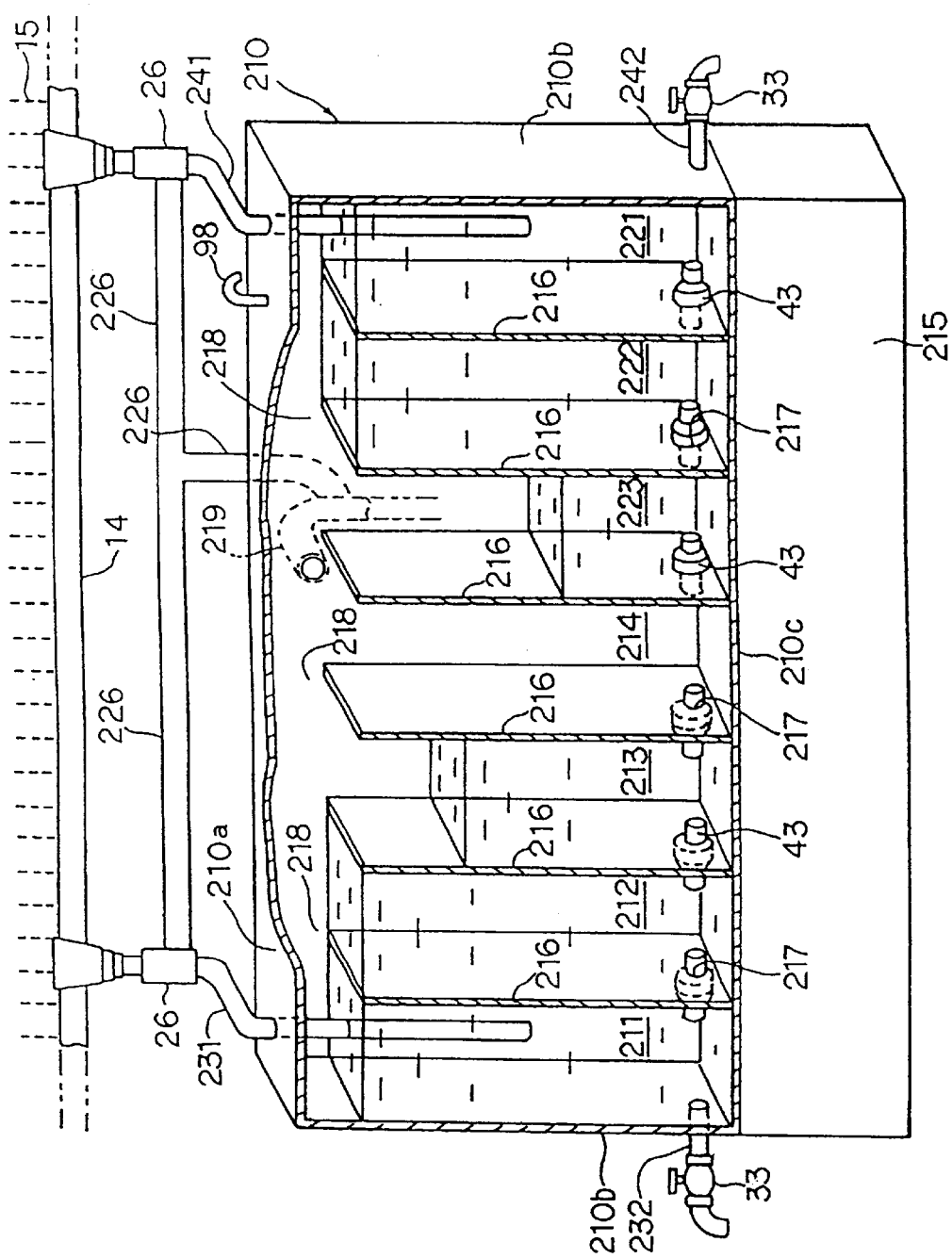
FIG. 14 is a perspective view of a principal part of a general service water service equipment of a ninth embodiment according to the present invention.

FIG. 14 shows a ninth embodiment of the present invention. In FIG. 14, the same reference number as that of FIG. 12 shows the same component.

In this embodiment, a single storage vessel 210 is mounted on a block 215 embedded in the ground at a lower end portion thereof along a periphery edge of a house (not shown in the drawing), so as to be positioned lower than the rainwater gutter 14 at an upper face thereof. The block 215 has a relatively small thickness, the single storage vessel 210 has substantially the same thickness as that of the block 215. An inside of this storage chamber 210 is partitioned into seven longitudinally elongated storage chambers 211–214 and 221–223 by six partition plates 216 extending substantially in the vertical direction. Hereinafter, left side three storage chambers 211–213 of seven storage chambers 211–214 and 221–223 are referred to as a first storage chamber 211, a second storage chamber 212 and a third storage chamber 213 in order from the left, right side three storage chambers 221–223 are referred to as a first storage chamber 221, a second storage chamber 222 and a third storage chamber 223 in order from the right, and the remaining center storage chamber is referred to as a fourth chamber 224.

A lid plate 210a, side plates 210b and a bottom plate 210c are combined into a flat rectangular parallelepiped to form a single storage vessel 210, an inside of which is sealed. This single storage vessel 210 comprises a construction in which two of the single storage vessel of the seventh embodiment are combined symmetrically right and left with owned commonly the fourth storage chamber. The rainwater 15 received in the rainwater gutter 14 is led to the right and left first storage chambers 211, 221 through two of the right and left supply passages 231, 241. The first supply passages 231, 241 are connected to the rainwater gutter 14 at upper ends thereof and inserted into the right and left first storage chambers 211, 221 through the lid plate 210a, respectively. The rainwater diverters 26, 26 are connected on the middle of the first supply passages 231, 241 respectively.

A portion of the side plate 210b of the single storage vessel 210 for forming right and left first storage chambers 211, 221 is connected with one ends of the second supply passages 232, 242 at lower portions thereof, respectively. The other ends of these passages 232, 242 are provided with the supply valves 33, 33 respectively. Six partition plates 216 are provided with the lower portion communicating means 217 at lower ends thereof respectively. The lower portion communicating means 217 comprises a through hole in this embodiment. These lower portion communicating means 217 are inserted with nonreturn valves 43 each having the same construction as that of the first embodiment. The nonreturn valve 43 is adapted to prevent the rainwater 15 from flowing into the lower portion communicating means 217 toward the first storage chambers 211, 221 when a pressure on a proximal side to the first storage chambers 211, 221 with respect to the nonreturn valve 43 is not less than a pressure on a distal side to the first storage chambers 211, 221, to allow the rainwater 15 to flow into the lower portion communicating means 217 toward the first storage chambers 211, 221 when a pressure on a proximal side to the first storage chambers 211, 221 with respect to the nonreturn valve 43 is not less than a pressure on a distal side to the first storage chambers 211, 221. That is, the left side three nonreturn valves 43 are arranged in the same direction as that of the seventh embodiment, and the right side three nonreturn valves 43 are arranged in the reverse direction to that of the seventh embodiment.

An upper portion communicating means 218 is formed by leaving a predetermined space between the upper ends of the six partition plates 216 and the lid plate 210a for communicating the respective storage chambers 211–214 and 221–223. These upper portion communicating means 218 are adapted to lead the rainwater 15 exceeding over the predetermined water level to the right and left side adjacent second to fourth storage chambers 212–214, 222, 223 and 214 respectively when the rainwater 15 stored in the right and left side first to third storage chambers 211–213 and 221–223 go up in water level up to the predetermined water level. A portion of the side plate 210b of the single storage vessel 210 for forming the fourth storage chamber 214 is connected to one end of the overflow pipe 219 at an upper end thereof, the other end of the overflow pipe 219 is connected to the sewerage (not shown in the drawing). This overflow pipe 219 is adapted to lead the rainwater 15 exceeding over the predetermined water level to the sewerage, when the rainwater 15 stored in the fourth storage chamber 214 go up in the water level up to over the predetermined water level. Further, the lid plate 210a of the single storage vessel 210 is connected to the substantially reverse J-shaped air vent pipe 98. The discharge pipe 226, 226 connected to lower portions of periphery faces of two rainwater diverter 26, 26 are connected with each other and then connected to the overflow pipe 219.

The operation of the general service water storing equipment constructed as mentioned above is the same as that of the seventh embodiment described above except that the single storage vessel 210 performs a function as a fence surrounding a house (not shown in the drawings) in cooperation with the block 215, so that the repeat explanation will be omitted.

Incidentally, although the storage vessels are stacked in three in the first and second embodiments, a single storage vessel is partitioned into four storage chambers by partition plates extending in the horizontal direction, in the third and fourth embodiments, these are merely examples. Accordingly, the storage vessels may be stacked in two or four and more, and the storage chamber may be partitioned into three and less, or five or more. Moreover, although the storage vessels are arranged in three in the horizontal direction in the fifth and sixth embodiments, and a single storage vessel is partitioned into four or seven storage chambers by partitioning plates extending in the vertical direction in the seventh to ninth embodiments, the storage vessels may be arranged in two or four and more, and the storage vessel may be partitioned into three and less, five, six or eight and more.

Further, although the second supply passage 22 is connected with the extending pipe 34 at an upper portion thereof, and the stop valve 36 is disposed on the middle of the pipe 34 in the first and second embodiments, a position of connecting the extending pipe 34 on the second supply passage 22 may not be at the upper portion of the second supply passage 22, but may be at a center or a lower portion of the second supply passage 22. Also, two and more extending pipes 34 may be connected to the second supply passage 22, wherein respective extending pipes 34 are provided with stop valves 36 respectively. And, the extending pipe may be connected to the second supply passage of the third to eighth embodiments.

Still further, although one end of the second supply passage is connected to a lower face of the uppermost storage vessel or storage chamber, and one end of the third supply passage is connected to a lower face of respective storage vessels or storage chambers except the uppermost storage vessel of storage chamber in the first to fourth embodiments, one end of the second supply passage may be connected to the uppermost storage vessel or storage chamber, and one of the third supply passage may be connected to the respective storage vessels or storage chambers except the uppermost storage vessel or storage chamber.

Moreover, although the rainwater passage comprises the rainwater gutter disposed on a periphery end of the roof of the house in the first, third to fifth, seventh to ninth embodiments, it may comprises a concave gutter for rainwater disposed on the periphery edge of the roof of the building.

Further, the first storage vessel or the first storage chamber of the general service water equipment in the first, third to fifth, seventh to ninth embodiments may be connected to the bathtub through the fourth supply passage and the pump of the general service water equipment in the second and sixth embodiments. In this case, because the storage vessel or the storage chamber is stored with the used water of the bathtub in addition to the rainwater, the amount of the general service water stored in the storage vessel of the storage chamber is increased.

As described above, according to the present invention, a plurality of the storage portions are disposed along the vertical direction at positions lower than the rainwater passage, the first supply passage connects the rainwater passage to the uppermost storage portion, the second supply passage connected to the lower face of the uppermost storage portion at one end thereof is provided with the supply valve at the other end thereof, the third supply passage is provided with the nonreturn valve at one end thereof, the third supply passage is connected to the lower face of the storage portions except the uppermost storage portion at one ends thereof respectively, and connected to the second supply passages at the other ends thereof respectively, the overflow passage is adapted to lead the rainwater exceeding over the predetermined water level to the storage portions just below the above mentioned storage portion, when the rainwater stored in the storage portions except the lowermost storage portions go up in water level up to over the predetermined water level. Accordingly, the rainwater is collected in order from the uppermost storage portion, and the rainwater is supplied to the destination of supply in order from the uppermost storage vessel.

As a result, the stored rainwater can be supplied to the required place as the general service water by utilizing the potential energy of the rainwater in the storage portion without utilizing the power source such as the pump and the like.

Moreover, since a plurality of storage portions are arranged in the vertical direction, the general service water storing equipment can be installed in a relatively narrow space, and can increase and decrease the water storage capacity relatively easily by increasing and decreasing the number of the storage vessels.

Also, the fourth supply passage connects the uppermost storage portion of a plurality of the storage portions arranged in the vertical direction and the bathtub, and the pump is disposed on the middle of the fourth supply passage, accordingly, the used water of the bathtub can be stored in the storage portion and then supplied to the required place as the general service water by utilizing the potential energy thereof, so that the used water of the bathtub can be utilized effectively.

Further, if a plurality of longitudinally elongated storage portions are also arranged so as to form in line in the horizontal direction, the same advantages as the mentioned above can be obtained.

INDUSTRIAL APPLICABILITY

The equipment of the present invention can store the rainwater or the used water of the bathtub, so that stored water can be utilized as a general service water such as a sprinkle water over a garden, a washing water for a car, a flushing water for a toilet and the like.

We claim:

1. An apparatus for the storage and dispensing of water comprising:

(A) a plurality of containers in series for holding water;

(B) a collecting means communicating with a first container in the series for collecting and introducing water to the first container;

(C) a first communication means between each container in the series and a next container in the series for allowing water entering each container that is full to flow into the next container in the series and preventing water entering each container that is not full from flowing into the next container in the series;

(D) a second communication means between each container in the series and a previous container in the series for emptying each container by allowing flow of water from each container into the previous container when the water pressure in each container is higher than the water pressure in the previous container and preventing water flow between each container and the previous container when the water pressure in each container is lower than the water pressure in the previous container; and (E) an operator activated means communicating with the first container in the series for controllably emptying the first container in the series.

2. The apparatus according to claim 1, further comprising:

(F) overflow means communicating with at least one container in the series for accepting water introduced into the series when all the containers of the series are full.

3. The apparatus according to claim 2, wherein the collecting means comprises a rainwater passage disposed along a peripheral edge of a roof of a house for receiving a rainwater from the roof and a third communication means between the rainwater passage and the first container in the series.

* * * * *